(12) United States Patent
Rea et al.

(10) Patent No.: US 8,646,266 B2
(45) Date of Patent: Feb. 11, 2014

(54) HYDRAULIC OUTPUT DRIVE SHAFT GENERATOR

(75) Inventors: Jeff Rea, Ames, IA (US); Olaf Koltoff, Boenebuettel (DE); Frank Ramm, Flintbek (DE); Eckhard Skirde, Aukbrug (DE)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 13/550,807

(22) Filed: Jul. 17, 2012

(65) Prior Publication Data

US 2012/0279208 A1 Nov. 8, 2012

Related U.S. Application Data

(63) Continuation of application No. 12/434,711, filed on May 4, 2009, now Pat. No. 8,312,715.

(30) Foreign Application Priority Data

Jun. 16, 2008 (DE) .......................... 10 2008 028 547

(51) Int. Cl.
*B60K 25/02* (2006.01)

(52) U.S. Cl.
USPC ................................................ 60/414; 60/487

(58) Field of Classification Search
USPC ............................................ 60/414, 486, 487
See application file for complete search history.

(56) References Cited

U.S. PATENT DOCUMENTS

| | | | |
|---|---|---|---|
| 7,793,496 B2 * | 9/2010 | Rampen et al. | 60/414 |
| 8,312,715 B2 * | 11/2012 | Rea et al. | 60/414 |
| 2006/0118346 A1 * | 6/2006 | Rampen et al. | 180/165 |
| 2007/0249455 A1 * | 10/2007 | Hasegawa et al. | 475/78 |

FOREIGN PATENT DOCUMENTS

DE    10151308 A1    5/2003

* cited by examiner

*Primary Examiner* — Thomas E Lazo
(74) *Attorney, Agent, or Firm* — Zarley Law Firm, P.L.C.

(57) ABSTRACT

The invention relates to a mobile machine having a traction drive and working hydraulics. The drive unit has a radial piston pump which is driven by a drive set and supplies working hydraulics. The radial piston pump is arranged on the axis of the output drive shaft of the drive set, between the drive set and a gearbox which is connected thereto via the output drive shaft. The drive set, the radial piston pump and the gearbox in this case form a compact drive unit.

8 Claims, 3 Drawing Sheets

HYDRAULIC OUTPUT DRIVE SHAFT GENERATOR

CROSS REFERENCE TO A RELATED APPLICATION

This application is a continuation of U.S. Ser. No. 12/434,711 filed May 4, 2009 now U.S. Pat. No. 8,312,715.

BACKGROUND OF THE INVENTION

The invention relates to a drive unit for driving a mobile machine having a hydraulic generator for working hydraulics.

Mobile machines have a drive set, for example, in the case of a mobile construction machine, an internal combustion engine or, for example, an electric motor in the case of a fork-lift truck. This drive set is used for the traction drive and can additionally provide energy for possible working hydraulics, for example for raising and lowering the forks in the case of a forklift truck and/or can be used to drive secondary appliances, for example a generator.

Drive systems in which a hydraulic pump or a hydraulic motor is arranged between an internal combustion engine and a gearbox are known, for example, from US 2006/0118346 A1. This document describes how a hydraulic hybrid system can be integrated in a vehicle. The hydraulic pump allows kinetic energy to be taken from the vehicle via the drive train, for example during braking. The energy is stored in a pressure accumulator and is emitted as required again to the drive train via the hydraulic motor. The hydraulic set, according to US 2006/0118346 A1, may be in the form of a continuously variable radial piston pump, and it is in this case used purely for the traction drive.

Furthermore, crankshaft generators are known as electrical generators from commercial vehicles. One such system is described in DE 103 51 308 A1. This relates to a vehicle axle system with a front vehicle axle, which is preferably mounted in a pendular form, for agricultural or industrial commercial vehicles, in which an electrical drive is provided for this axle, which is not driven by the internal combustion engine. In this case, an electrical crankshaft generator is arranged between the internal combustion engine and the gearbox. The electrical energy obtained from the crankshaft generator is used to drive the axle system. The electrical components for the electrically driven axle are in this case preferably fitted in a torque tube in the vehicle. The torque tube furthermore has the function of supporting the axle suspension on the frame. A concept is therefore also described here in which the energy obtained via an electrical crankshaft generator is used for the drive, in this case for a vehicle axle which is not driven by the internal combustion engine.

SUMMARY OF THE INVENTION

The present invention is based on the object of developing a drive system, which is physically short in the longitudinal direction of the output drive shaft of a drive set, for driving a mobile machine with working hydraulics and possibly secondary appliances, which drive system may have various types of gearboxes and can split the power of the drive set as efficiently as possible between the traction drive, the working hydraulics and any secondary appliances.

According to the invention, a hydraulic pump is arranged on the output drive shaft of the drive set, between a drive engine and a gearbox, in order to drive a mobile machine, with this hydraulic pump being a radial piston pump. A radial piston pump offers the advantage that it has a very short physical length in the direction of the output drive shaft axis of the drive set. For example, the drive set may be in the form of an internal combustion engine, which is operated using diesel, petrol, gas or other fuels, or may be in the form of an electric motor. Particularly in the case of drive units which are installed transversely with respect to the vehicle direction, the physical length of the overall drive unit, which comprises at least the drive set, the radial piston pump and the gearbox, plays a major role, with the physical length of the radial piston pump directly affecting the overall length.

The use of a radial piston pump which is acted on from the outside and has tilting pistons for supplying the working hydraulics may also be advantageous, since this has smaller diametric dimensions than conventional radial piston pumps. This type of radial piston pump therefore offers not only the advantage of a short design in the longitudinal direction of the drive axis, but also the advantage of a smaller diametric physical space. The physical space required for the compact drive unit for a mobile machine can thus be further reduced.

In this case, widely differing gearbox configurations can be integrated in the compact drive unit. For example, mechanical gearboxes, power splitting gearboxes, in particular hydromechanical gearboxes (HMGs), torque converters with load-switching gearboxes or hydrostatic traction drive pumps can be provided as gearboxes. For example, a mechanical gearbox and a radial piston pump for supplying the working functions are arranged on the same centre axis as the output drive shaft of the drive set in the vehicle. In the case of hydrostatic traction drives, at least the hydraulic pump for the traction drive is fitted on the same centre axis as the output drive shaft of the drive set. By way of example, hydrostatic gearboxes and drives are frequently used in mobile machines. One embodiment which is advantageous in this case is a closed circuit with a variable pump, for example, an axial piston pump with a swash plate, and a hydraulic motor, which may be in the form of a constant or variable motor. The hydraulic motor may in this case be designed with the pistons arranged radially or axially, or may be designed in some other way.

The compact drive unit may in this case be regarded as a structural unit. Configuration as a compact assembly which, for example, can be arranged in a housing, results in advantages during assembly and dismantling of the drive train. For example, different embodiments of the drive set and of the radial piston pump can be offered on a building-block principle, and can be provided as prefabricated units, for example during assembly of the mobile machine. The embodiment in the form of a complete assembly also offers advantages in handling for repair tasks on the mobile machine, or on replacement of the drive.

The radial piston pump can be connected variably, depending on the requirement. For example, the radial piston pump is integrated in an open oil circuit and has a suction connection and at least one high-pressure connection for supplying hydraulic energy to working hydraulics functions. In this case, by way of example, the following systems may be mentioned as functions of the working hydraulics: steering of the drive machine, actuators for raising, lowering and tilting a shovel or forks, for example for a fork-lift truck or excavator, actuators for traction and extension of a telescopic arm or further hydraulic actuators for carrying out work functions. With many loads, it is worthwhile distributing the hydraulic energy specifically, for example via a logical valve control system or a valve block.

Various secondary loads such as generators (dynamos), a cooler pump, fan compressors, for example for the braking system of the mobile machine or for boosting the internal combustion engine, etc., can also be driven as required via the radial piston pump. For the purposes of the invention, these secondary appliances are regarded as part of the working hydraulics. The use of hydraulic energy for driving loads directly may have advantages because of the fact that there is no need to convert energy. For example, in the case of an electrical cooler pump, the mechanical energy supplied from the drive set must first of all be converted to electrical energy and must then be converted back to mechanical energy again, which can be done, for example, via an electrical generator and an electric motor. The radial piston pump can directly drive at least some of the secondary appliances, which means that there is no need for energy conversion, thus avoiding the energy losses associated with this. Furthermore, this can offer advantages in that a generator which, for example, is driven hydraulically, and the electrical system connected to it can be designed to be smaller thus resulting in further advantages in physical space and with regard to costs. Furthermore, a hydraulically driven generator can be arranged in parallel with the mechanical drive of the machine.

It is also possible to use the radial piston pump to fill a hydraulic accumulator. By way of example, the accumulator is filled when more energy is being produced by the drive set than is being consumed by the traction drive and the other hydraulic loads. In particular, the hydraulic accumulator can be filled when so-called regenerative braking is taking place, for example during braking of the mobile machine, in which at least a portion of the braking energy, that is to say the kinetic energy of the vehicle, is converted to hydraulic energy. Furthermore, it may be advantageous to deliberately demand more energy from the drive set in order to operate it in a range with better efficiency and to pass excess energy to the hydraulic accumulator, when this energy is not being consumed, for example, by the drive and the working hydraulics with the secondary appliances.

Furthermore, it is possible to supply various hydraulic loads, both individually and jointly, from the radial piston pump and the hydraulic accumulator at the same time.

The hydraulic accumulator allows the loads to be supplied with energy without having to operate the radial piston pump. The hydraulic accumulator therefore carries out the function of an energy buffer. This can be used, for example, when the drive set is at rest or during traction operation, without having to tap energy off from the drive set to the radial piston pump. The latter may be advantageous, for example, in the case of a fork-lift truck, a wheeled loader or a telehandler when lowering a load while in motion. It is therefore possible to design the drive set to be smaller since the maximum power which can be demanded from the mobile machine comprises the power of the drive set and the power of the sets which are driven from the hydraulic accumulator.

The energy which is stored in the hydraulic accumulator can also be emitted again via the radial piston pump, which is then operated as a hydraulic motor. By emptying the hydraulic accumulator, it is therefore possible to make more energy available to the drive train than is being produced by the engine. This could be advantageous, for example, during starting or during acceleration.

The hydraulic pressure accumulator can also cover further functions. An emergency running function would be feasible in which the energy stored in the hydraulic accumulator is used to operate a hydraulic traction drive motor at least until no more energy is stored in the hydraulic accumulator. Furthermore, of course, the radial piston pump can also be used as a traction pump, for example in the event of failure of the hydraulic drive pump.

Furthermore, the radial piston pump can be used in conjunction with a hydraulic accumulator to carry out the function of a starter when an internal combustion engine is being used as the drive set. This therefore means that, for example, there is no need for an electromechanical starter, and this has advantages in terms of physical space and costs.

The power consumption of the hydraulic crankshaft generator, that is to say of the radial piston pump, can be varied. In this case, the entire power of the drive set, which, for example, is in the form of an internal combustion engine, can be passed through to the traction drive through the centre axle, which corresponds to the output drive shaft axle of the drive set. However, all of the power can also be consumed by the hydraulic pump when no energy is required for the traction drive but only for the working hydraulics with secondary appliances and/or for the hydraulic accumulator. Any conceivable power split between the traction drive and the radial piston pump between these extremes is also possible for supplying the working hydraulics together with any secondary appliances and/or for filling the hydraulic accumulator.

Furthermore, a radial piston pump design interleaved in the radial direction for the working hydraulics with the gearbox or the drive set is also possible. For example, the piston support for the radial piston pump for the working hydraulics can be arranged in the radial direction around the axial piston pump for the traction drive. A configuration such as this makes it possible to further shorten the physical space in the axial direction of the output drive shaft of the drive set.

The major idea of the invention is the combination of a drive set with the radial piston pump and a gearbox to form a drive unit which is physically compact in the axial direction, in order in this way to supply working hydraulics with work functions and any secondary drives and/or a hydraulic accumulator with hydraulic energy directly from the radial piston pump, in which case the mobile machine is driven, possibly at the same time.

There are various options for embodiments of the teaching of the present invention in an advantageous manner. Preferred embodiments will be explained in more detail in the following text with reference to the attached figures.

DETAILED DESCRIPTION OF THE PREFERRED EMBODIMENTS

Figure 1:
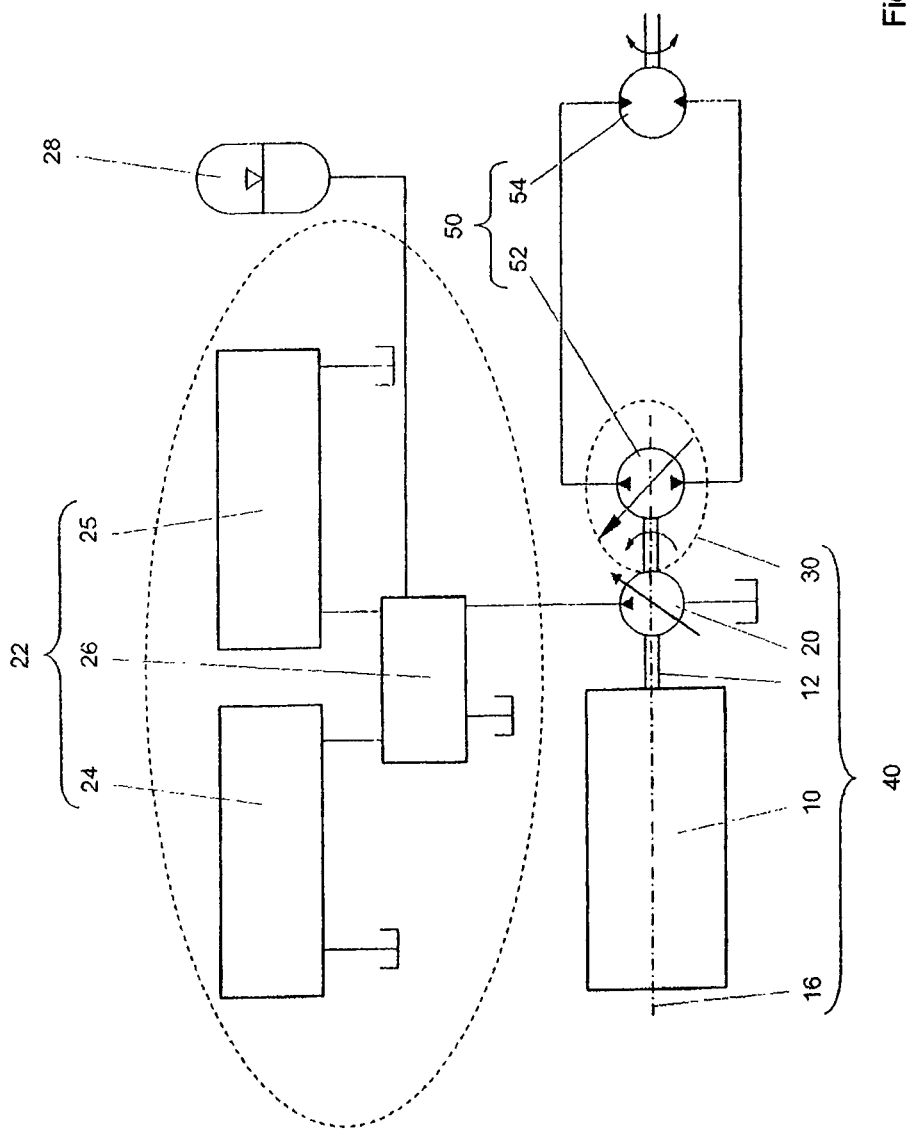
FIG. 1 shows a schematic illustration of a mobile machine with a compact drive unit according to the invention.

FIG. 1 shows schematically how a drive system of a mobile machine can be arranged with the associated working hydraulics 22 for work functions 24 and secondary appliances 25 as well as a valve block 26 according to the invention. The drive set, or in this case an internal combustion engine 10, in this case drives the radial piston pump 20 for the working hydraulics 22 via the output drive shaft 12, or via the crankshaft. Furthermore, energy can be passed to the gearbox 30 via the centre axle of the radial piston pump 20. In this exemplary embodiment, a traction drive pump 52 of a hydrostatic traction drive 50 is used as a gearbox 30 with a traction drive motor 54, in the form of a constant motor, in a closed hydraulic circuit. Furthermore, a hydraulic accumulator 28 is arranged in the mobile machine. The oil which is sucked in by the radial piston pump 20 via a suction line is then split by the valve block 26 between the work functions 24, the secondary drives 25 and the hydraulic accumulator 28.

With appropriate connection of the valve block 26, the hydraulic energy of the hydraulic accumulator 28 can be used for the work functions 24 and/or for the secondary appliances 25, and/or the radial piston pump 20 can be driven, and then operates as a motor. The power of the radial piston motor can then be fed into the traction drive, or can be used as a starter for the internal combustion engine. Furthermore, the hydraulic loads, in this case the work functions and the secondary appliances, can also be supplied jointly via the radial piston pump and the hydraulic accumulator.

Figure 2:
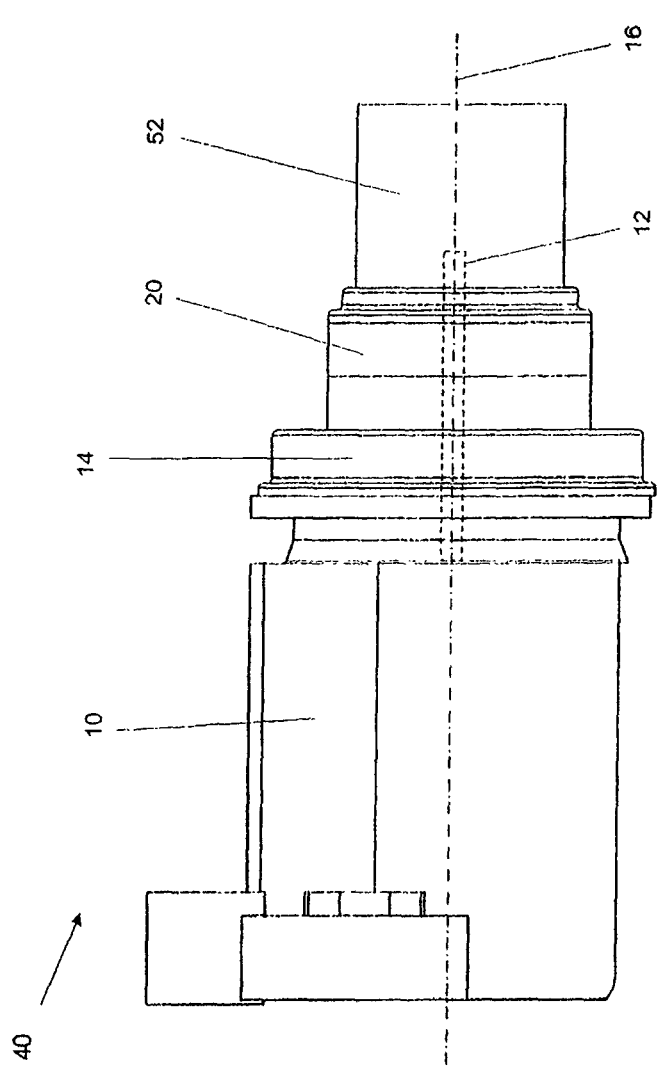
FIG. 2 shows a compact drive unit according to the invention, illustrated schematically, with the radial piston pump being arranged on the flywheel housing of the internal combustion engine.

FIG. 2 illustrates, schematically, a compact drive unit 40, having an internal combustion engine 10 with a flywheel housing 14, a radial piston pump 20 and a traction drive pump 52. In this case, both the radial piston pump 20 and the traction drive pump 52 are located on the axis 16 of the output drive shaft 12 of the drive set 10, or in this case the crankshaft. The radial piston pump 20 is in this case arranged directly on the flywheel housing 14 of the drive set 10, or in this case the internal combustion engine. The traction drive pump 52 is arranged on the end housing of the radial piston pump 20. This therefore results in a drive unit 40 which is very compact in the direction of the crankshaft axis, according to the invention.

Figure 3:
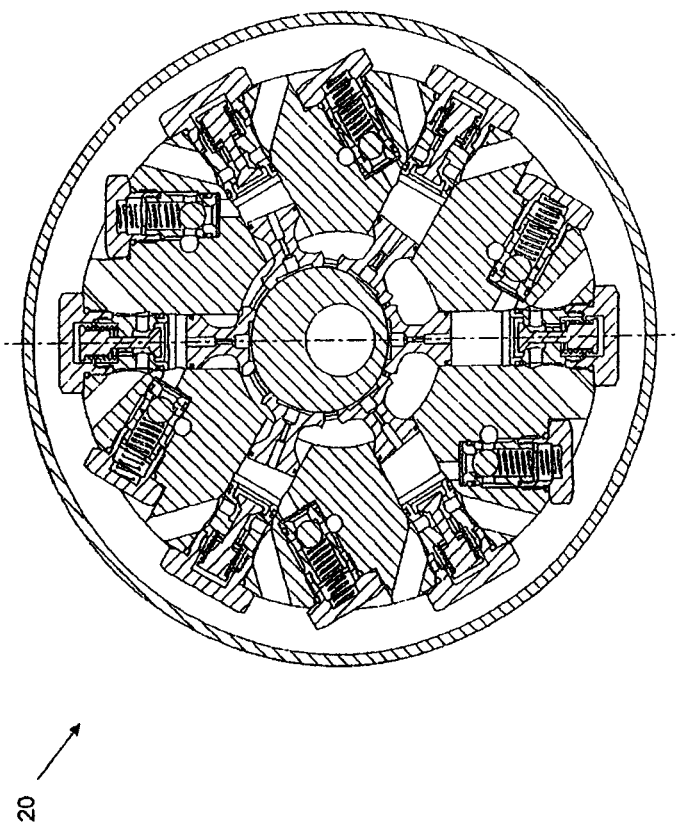
FIG. 3 shows a section illustration of a specific radial piston pump, which may be used in the compact drive unit according to the invention.

FIG. 3 shows a radial piston pump 20 which is acted on from the outside and has tilting pistons. This additionally offers the advantage that, in addition to the small axial physical space occupied by a radial piston pump 20, it also has the advantage of having a smaller diametric physical space than other radial piston pumps 20 with pistons guided in the cylindrical longitudinal direction.

We claim:

1. Mobile machine having a traction drive and working hydraulics (22), which machine has a radial piston pump (20) which is driven by a drive set (10), supplies the working hydraulics (22) and is arranged on the axis of the output drive shaft (12) of the drive set (10), between the drive set (10) and a gearbox (30) which is connected thereto via the output drive shaft (12), and the drive set (10), the radial piston pump (20) and the gearbox (30) form a compact drive unit (40);

wherein the working hydraulics (22) have hydraulic actuators which can separately or jointly be supplied with hydraulic energy, selectively, individually, or at the same time from the radial piston pump (20) or a hydraulic accumulator (28) connected to the radial piston pump (20) such that the hydraulic accumulator (29) can be filled by the radial piston pump (20).

2. Mobile machine according to claim 1, characterized in that the drive set (10) is in the form of an internal combustion engine.

3. Mobile machine according to claim 2, characterized in that the radial piston pump (20) is fitted to the flywheel housing (14) of the internal combustion engine (10).

4. Mobile machine according to claim 1, characterized in that the power of the drive set (10) can be passed to a gearbox (30) via the output drive shaft of the radial piston pump (20).

5. Mobile machine according to claim 1, characterized in that the hydraulic accumulator (28) emits hydraulic energy to the radial piston pump (20) when the radial piston pump (20) is being operated as a motor.

6. Mobile machine according to claim 1, characterized in that the gearbox (30) has a traction drive pump (52), with the traction drive pump (52) being arranged on the axis of the output drive shaft (12).

7. Mobile machine according to claim 6, characterized in that the traction drive pump (52) is in the form of an adjustable axial piston pump.

8. Mobile machine according to claim 1, characterized in that the radial piston pump (20) is a radial piston pump which can be admitted from the outside and has tilting pistons.

\* \* \* \* \*